L. G. DANIELS.
UNIVERSAL JOINT.
APPLICATION FILED NOV. 30, 1918.
1,382,958.
Patented June 28, 1921.
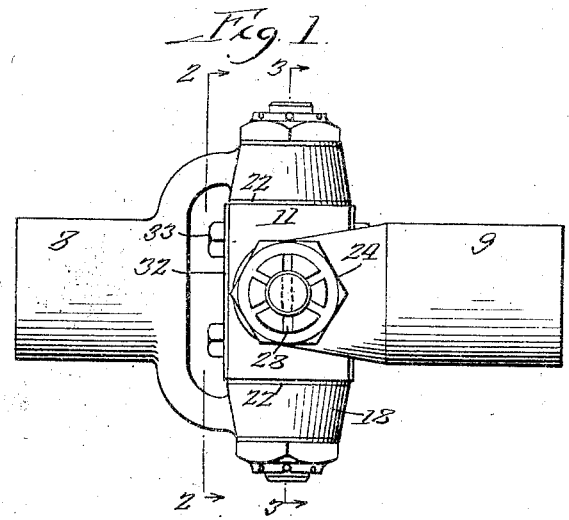
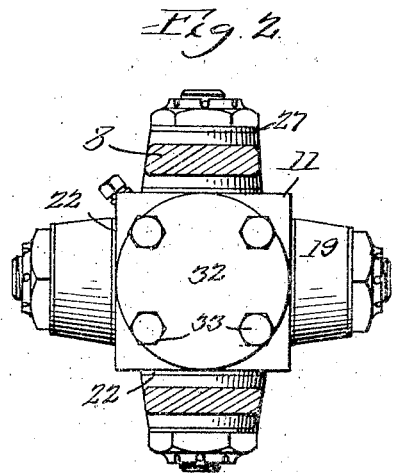
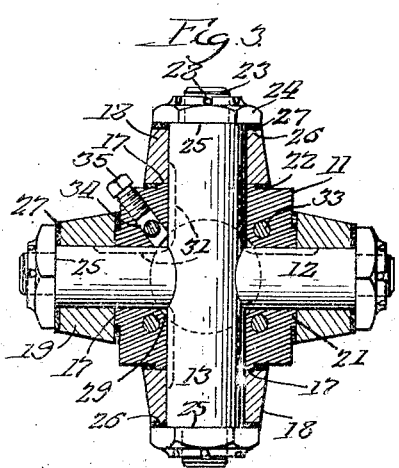
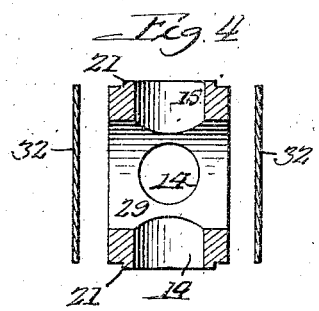
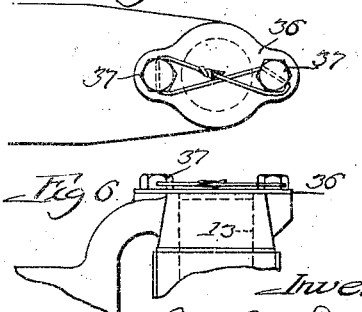
Inventor:
Lee G. Daniels
By Ira J. Wilson
Atty.

UNITED STATES PATENT OFFICE.

LEE G. DANIELS, OF ROCKFORD, ILLINOIS.

UNIVERSAL JOINT.

1,382,958.  Specification of Letters Patent.  Patented June 28, 1921.

Application filed November 30, 1918. Serial No. 264,820.

*To all whom it may concern:*

Be it known that I, LEE G. DANIELS, a citizen of the United States, residing at Rockford, in the county of Winnebago and State of Illinois, have invented certain new and useful Improvements in Universal Joints, of which the following is a specification.

This invention relates to universal joints of the well known type adapted for coupling disalined driving and driven members and for transmitting rotative movement from one to the other, and has more particular reference to that class of joints especially adapted for connecting the drive shaft sections in motor vehicles.

Because of the location of these universal joints and the severe and continued usage to which they are subjected, the problem of keeping them free from dust and dirt and properly lubricated and of attaining these ends by a construction which is practical, efficient and capable of economical commercial production, has been a difficult one to designers and manufacturers. In some cases more or less complicated and costly casings have been devised to house the working parts, and in others the working parts are of such peculiar and complicated construction as to render them extremely costly to manufacture and very susceptible to wear because of inadequate provision for lubrication.

These various objections I have aimed to overcome by the provision of a universal joint of novel construction. And in furtherance of this general object I have devised a universal joint comprising but few parts so constructed as to efficiently transmit a maximum load and to be capable of production at a comparatively low cost. Another object is to so construct and arrange the parts that the bearings are dust-proof, oil-tight and self-lubricating.

Other objects and inherent advantages will be appreciated by those familiar with this art as the invention becomes better understood by reference to the following description when considered in connection with the accompanying drawings in which I have illustrated a working embodiment of what I consider at present to be the best form of my improvements.

Referring to the drawings,—

Figure 1 is a view in elevation of a universal joint embodying my improvements;

Figs. 2 and 3, cross-sectional views taken substantially on the lines 2—2 and 3—3 respectively, of Fig. 1;

Fig. 4, a detail sectional view through the transmission block and end plates therefor; and Figs. 5 and 6, plan and side fragmentary views respectively, of a modified form of closure for the outer end of each yoke arm.

My improved universal joint or coupling includes primarily three parts, viz: a pair of yokes designated generally by characters 8 and 9 and a transmission block 11. The yokes, as is well understood, are adapted to be suitably fixed to the ends of the driving and driven members (not shown) and are preferably forgings, the terminal ends or arms of which are bored to provide alined bearings for the trunnions which will be presently described.

The transmission block 11 carries projecting trunnions which fit in the bearings in the terminal ends of the yokes. The trunnions are preferably formed from two rods or trunnion pins 12 and 13 of different diameters, the smaller pin 12 intersecting the larger pin medially at righ angles, as shown in Fig. 3. The block 11 is bored through at 14 and 15 to receive the trunnion pins 12 and 13 respectively. I prefer to form the block 11 of soft steel and the holes 14 and 15 in the blocks are from one to three thousandths of an inch smaller than the bearings 16 in the arms of the yokes. The trunnion pins which are screw-machine products, heat treated and ground to diameter, are pressed through the holes 14 and 15 when assembling the joint, and by reason of the press fit between the trunnion pins and the transmission block the pins are rigidly held in connection with the block so that the torque strain is taken by the block instead of being brought to bear on the joint between the trunnion pins. Although the hardened pins have been pressed by force through the openings 14 and 15 their trunnion ends are not scratched by this operation because of the soft steel composition of the transmission block.

By grinding the trunnion pins to diameter and likewise finishing the bearings to the proper diameter, no bushing is neecssary as I have provided means for effectively excluding all foreign matter from these bearings and for properly lubricating them. It will be noted that the inner ends 17 of the terminal arms 18 and 19 have a bearing against the bosses 21 formed on the transmission block and that these bosses are so formed as to allow an annular space between this end of the terminal arms and the block for the reception of a packing gasket 22 which is preferably of felt or some other absorbent material. This packing serves to effectually keep foreign matter from entering the joint between the transmission block and the terminal arms. The trunnion pins have reduced threaded ends 23 upon which are threadingly engaged retaining nuts 24. These nuts are drawn down upon the shoulders 25 at the end of the trunnions, and it will be noted that the distance between the shoulders 25 on each trunnion pin is greater than the distance between the outer ends 26 of the terminal arms of the yokes, thus allowing spaces between these outer ends of the terminal arms and the adjacent nuts for the reception of packings 27, as clearly shown in Fig. 3. It will be especially noted that the packings 22 and 27 close the inner and outer ends of the bearings 16 and thus prevent foreign matter from working into these bearings, and being of absorbent material they serve very effectually to hold the oil which is supplied to these bearings in the manner presently to be mentioned. It will also be noted that by reason of the present arrangement of the packings 22 and 27, the latter are relieved of such working strains and compressions as are detrimental to the proper functioning of the packings. Any suitable means may be provided for locking the nuts on the trunnion pins, and in the present instance I have simply shown pins 28 passing through the reduced ends 23 and engaged in notches in the ends of the nuts.

I have now aimed to provide an oil reservoir or compartment within the transmission block 11 and to communicate each bearing 16 with this reservoir so that the bearings will be self-lubricating for a considerable period. To this end I have bored out the block from end to end transversely of the trunnion pins as indicated by character 29 in Figs. 3 and 4 and have grooved the trunnion pins longitudinally as at 31, thus providing oil channels between the oil reservoir 29 and the bearings 16. The ends of the oil reservoir are closed by cover plates 32 and the latter are clamped in position by bolts 33 which extend entirely through the block. The oil reservoir 29 may be filled through a suitable capped opening, such for instance as the opening 34 which is normally closed by the set-screw cap 35.

In Figs. 5 and 6, I have illustrated another form of closure for the outer end of each trunnion bearing. This omits the threaded ends and nuts, and from Fig. 6 it will be seen that the trunnion does not extend beyond its bearing. Instead, a cover plate 36 closes the end of the bearing and is secured to the yoke arm by cap screws 37, as shown, suitable nut lock means being provided.

Attention is directed to the simplicity of the construction and arrangement of the few parts involved in this universal joint. The trunnion pins 12 and 13 coöperate with the transmission block in such manner as to give a very strong and durable construction, so that the torque strain will be transmitted through the block and not brought to bear at the joint between the pins. The trunnions provide ample bearing surface and these bearings are inclosed in a very simple and effective manner against the entrance of dust, dirt and foreign matter. The simple provision for oiling is thoroughly practical, as a reservoir of sufficient size is provided within the transmission block, the oil channels between the reservoir and bearings are comparatively short and direct, and the bearings are well packed and tight. Attention is also directed to the advantageous arrangement of the packings by forming the shoulders 21 on the transmission block to take the lateral strains of the yokes. Further notice is called to the comparatively simple construction of the transmission block 11 as it is contemplated to form these blocks from square bar stock and to bore out each block to provide for the oil reservoir and the trunnion pin fittings. By closing the ends of the reservoir with flat cover plates such as 32 and the use if necessary, of suitable gaskets between these plates and the transmission block, an oil reservoir of large capacity is obtained without being detrimental to the strength of the block. A closed oil container of this type has many advantages over those constructions in which a more or less complicated casing houses the entire joint structure and often includes leather parts or other parts which deteriorate and wear and soon lose their effectiveness. My improved construction also insures that all of the oil will be used for lubricating purposes, as the oil is confined entirely to the reservoir, the oil grooves and the bearings. It should be understood that my invention in its broadest aspect contemplates the provision of a universal joint including yokes and a transmission block having trunnions in bearings in the terminal arms of the yokes, the outer ends of which bearings are open, suitable reservoir lubricant means for supplying a lubricant to the trunnion bearings, and caps or cover plates secured to the terminal arms and closing the outer open ends of the trunnion bearings. These features embodied in proper coöperative relation in a universal joint are factors which promote simplicity in construction and low cost of manufacture, and will produce a thoroughly practical and workable joint well adapted for the commercial market.

It is believed that the foregoing conveys a clear understanding of my improvements and while I have illustrated and described but a single working embodiment thereof, it should be understood that various changes might be made in details of construction without departing from the spirit and scope of the invention as expressed in the appended claims, in which—

I claim:

1. A universal joint comprising a pair of yokes, the terminal arms of which are equipped with trunnion bearings, a transmission block, two trunnion pins of different diameter passing through the block and one pin passing through a central opening in the other at right angles thereto, the ends of the trunnion pins fitting in said bearings, an oil reservoir within the transmissiton block, and means for feeding oil from said reservoir to said trunnion bearings.

2. A universal joint comprising a pair of yokes, the terminal arms of which are equipped with trunnion bearings, a transmission block, two trunnion pins of different diameter passing through the block and one pin passing through a central opening in the other at right angles thereto, the ends of the trunnion pins fitting in said bearings, the diameters of the trunnion-pin openings in the block being smaller than those of the trunnion bearings for the respective trunnion pins and the trunnion pins having a press fit in said openings, an oil reservoir within the transmission block, and oil grooves in the trunnion pins between said reservoir and the trunnion bearings.

3. In a universal joint, a pair of yokes, a transmission block, trunnions extending quarteringly from the block and fitting in bearings in the terminal arms of the yokes, an oil reservoir within the block, a passage between each bearing and said oil reservoir, the block having a boss around the inner end of each trunnion leaving an annular space between the block and the adjacent yoke-connected surface, and a packing in the annular space at the inner end of each trunnion.

4. A universal joint comprising a pair of yokes, the terminal ends of which are provided with trunnion bearings, a transmission block having trunnions fitting in said bearings and having a central bore from end to end transverse to the axis of the trunnions and providing a lubricant reservoir, a passage connecting each trunnion bearing and the reservoir, and a cover plate or closure overlying each end of the bore and secured to the transmission block for closing the ends of the reservoir.

5. A universal joint comprising a pair of yokes, the terminal ends of which are provided with trunnion bearings, a transmission block, a pair of trunnion pins passing through the transmission block at right angles to each other and in a common plane and providing quarteringly arranged trunnions fitting in said bearings, the block having a central lubricant reservoir, and each trunnion pin having an oil groove connecting its bearing and the reservoir.

6. A universal joint comprising driving and driven members having terminal yoked arms each provided with a trunnion bearing, a transmission block, a pair of trunnion pins passing through the block at right angles to each other in a common plane and providing quarteringly arranged trunnions fitting in said bearings, means for lubricating the bearings from within the block, the outer ends of the trunnion bearings being open, a cover plate covering the outer end of each bearing opening, and cap screws for clamping the cover plates to the yoke arms.

7. In a universal joint, the combination of a pair of yokes having alined trunnion bearings in their terminal arms, a transmission block having trunnions located in said bearings, the outer ends of the bearings being open, means in coöperative relation to said trunnion bearings for supplying lubricant thereto, a comparatively flat plate seated on the outer face of each terminal arm and covering the opening of its respective trunnion bearing, and cap screws passed through each plate and threadingly engaged in the respective yoke arm for clamping a plate thereto.

8. In a universal joint the combination of a lubricant container forming a connecting member, cross pins removably connected within and projecting outside of said container, and a pair of independent yoke members arranged wholly outside of said container and having closed sockets for receiving the ends of said cross pins.

9. In a universal joint the combination of a lubricant container forming a connecting member, pins removably secured within and projecting outside of said container, and a pair of independent yoke members arranged wholly outside of said container and having closed sockets for receiving the ends of said pins.

LEE G. DANIELS.